United States Patent
Uskert et al.

(10) Patent No.: US 9,759,090 B2
(45) Date of Patent: Sep. 12, 2017

(54) GAS TURBINE ENGINE COMPONENT HAVING FOAM CORE AND COMPOSITE SKIN WITH COOLING SLOT

(71) Applicant: Rolls-Royce North American Technologies, Inc., Indianapolis, IN (US)

(72) Inventors: Richard C. Uskert, Timonium, MD (US); Ted J. Freeman, Danville, IN (US); David J. Thomas, Brownsburg, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 831 days.

(21) Appl. No.: 14/138,679

(22) Filed: Dec. 23, 2013

(65) Prior Publication Data
US 2015/0040570 A1    Feb. 12, 2015

Related U.S. Application Data

(60) Provisional application No. 61/771,914, filed on Mar. 3, 2013.

(51) Int. Cl.
*F01D 25/12* (2006.01)
*F01D 5/14* (2006.01)
(Continued)

(52) U.S. Cl.
CPC ............ *F01D 25/12* (2013.01); *F01D 5/147* (2013.01); *F01D 5/185* (2013.01); *F01D 5/282* (2013.01);
(Continued)

(58) Field of Classification Search
CPC .......... F01D 5/147; F01D 5/282; F01D 5/284; F01D 25/12; F01D 5/185; F01D 9/02;
(Continued)

(56) References Cited

U.S. PATENT DOCUMENTS 2,679,669 A * 6/1954 Kempe .................... B22C 9/04
106/38.3
2,687,278 A * 8/1954 Smith .................... B23P 15/04
164/132
(Continued)

FOREIGN PATENT DOCUMENTS

EP         1367223 A2    12/2003

OTHER PUBLICATIONS

International Search Report for PCT International Application Serial No. PCT/US2013/077459, completed Oct. 1, 2014, (15 pages).

*Primary Examiner* — Peter Helvey
(74) *Attorney, Agent, or Firm* — Barnes & Thornburg, LLP

(57) ABSTRACT

In one embodiment, a gas turbine engine component includes a foam based core and a composite skin member. Both the foam based core and the composite skin member can be used to structurally support the gas turbine engine component. The composite skin member can be a CMC material and is used to partially encapsulate the foam core. The gas turbine engine component can take the form of an airfoil member such as a blade or a vane, a combustor liner, etc. A first portion of the composite skin member includes a first surface extending past an edge of the component creating a step approximate an edge section. In another embodiment, composite skin members can be used to form a continuous shape for the edge section such that the foam core forms part of a gas path surface.

20 Claims, 2 Drawing Sheets

(51) Int. Cl.
  *F01D 5/28* (2006.01)
  *F23R 3/00* (2006.01)
  *F01D 5/18* (2006.01)
  *F01D 9/02* (2006.01)
  *F01D 25/08* (2006.01)

(52) U.S. Cl.
  CPC ............... *F01D 9/02* (2013.01); *F23R 3/002* (2013.01); *F23R 3/007* (2013.01); *F01D 25/08* (2013.01); *F05D 2240/35* (2013.01); *F05D 2260/203* (2013.01); *F05D 2300/514* (2013.01); *F05D 2300/603* (2013.01); *F05D 2300/6033* (2013.01); *F05D 2300/612* (2013.01); *F23R 2900/03041* (2013.01); *F23R 2900/03042* (2013.01); *F23R 2900/03043* (2013.01); *Y02T 50/672* (2013.01); *Y02T 50/676* (2013.01); *Y10T 29/49316* (2015.01)

(58) Field of Classification Search
  CPC ............... F01D 25/08; F05D 2300/21; F05D 2300/603; F05D 2240/35; F05D 2300/6033; F05D 2300/612; F05D 2300/514; F05D 2260/203; F23R 3/002; F23R 2900/03041; F23R 2900/03043; Y10T 29/49316; Y02T 50/672; Y02T 50/676
  USPC ............................... 60/754; 29/889; 415/115
  See application file for complete search history.

(56) References Cited

U.S. PATENT DOCUMENTS

| | | | | |
|---|---|---|---|---|
| 4,384,607 A | * | 5/1983 | Wood | B22C 9/04 164/132 |
| 4,422,229 A | | 12/1983 | Sadler et al. | |
| 5,425,174 A | * | 6/1995 | Hattori | C04B 35/584 29/527.6 |
| 5,640,767 A | * | 6/1997 | Jackson | B23P 15/04 118/427 |
| 5,690,473 A | * | 11/1997 | Kercher | F01D 5/183 415/115 |
| 5,810,552 A | * | 9/1998 | Frasier | B22C 9/04 415/115 |
| 5,822,852 A | * | 10/1998 | Bewlay | B22D 19/10 164/98 |
| 6,190,133 B1 | | 2/2001 | Ress, Jr. et al. | |
| 6,412,541 B2 | * | 7/2002 | Roesler | B22C 7/02 164/122.1 |
| 6,582,812 B1 | * | 6/2003 | Grylls | B22F 7/006 428/307.7 |
| 6,709,230 B2 | | 3/2004 | Morrison et al. | |
| 6,827,556 B2 | * | 12/2004 | Simon | F01D 5/147 415/200 |
| 7,093,359 B2 | | 8/2006 | Morrison et al. | |
| 7,255,535 B2 | | 8/2007 | Albrecht et al. | |
| 7,258,530 B2 | | 8/2007 | Morrison et al. | |
| 7,435,058 B2 | | 10/2008 | Campbell et al. | |
| 7,481,621 B2 | | 1/2009 | Campbell et al. | |
| 7,967,568 B2 | * | 6/2011 | Dalton | F01D 5/187 415/115 |
| 8,282,040 B1 | * | 10/2012 | Westman | B64C 3/24 244/123.1 |
| 8,980,435 B2 | * | 3/2015 | de Diego | C04B 37/001 416/241 B |
| 9,004,873 B2 | * | 4/2015 | Rice | F01D 5/147 416/230 |
| 2007/0072007 A1 | | 3/2007 | Carper et al. | |
| 2008/0025846 A1 | | 1/2008 | Vance et al. | |
| 2008/0124512 A1 | | 5/2008 | Steibel et al. | |
| 2012/0266603 A1 | | 10/2012 | Uskert et al. | |

\* cited by examiner

GAS TURBINE ENGINE COMPONENT HAVING FOAM CORE AND COMPOSITE SKIN WITH COOLING SLOT

CROSS REFERENCE TO RELATED APPLICATIONS

This application claims priority to and the benefit of U.S. Provisional Patent Application No. 61/771,914, filed 3 Mar. 2013, the disclosure of which is now expressly incorporated herein by reference.

TECHNICAL FIELD

The present invention generally relates to cooled gas turbine engine components, and more particularly, but not exclusively, to gas turbine engine components having a foam based structural core and cooling slot.

BACKGROUND

Providing structural support to cooled gas turbine engine components remains an area of interest. Some existing systems have various shortcomings relative to certain applications. Accordingly, there remains a need for further contributions in this area of technology.

SUMMARY

One embodiment of the present application is a unique gas turbine engine component having a foam core and a cooling slot. Other embodiments include apparatuses, systems, devices, hardware, methods, and combinations for gas turbine engine cooling. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
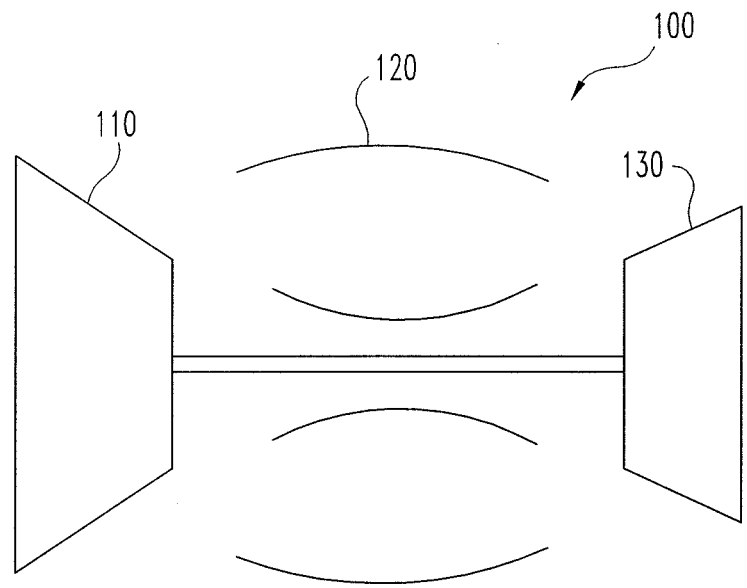
FIG. 1 is an embodiment of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, one embodiment of a gas turbine engine 100 is illustrated having a compressor 110, combustor 120, and turbine 130. A working fluid such as air is received by the compressor 110 whereupon it is compressed and provided to the combustor 120. Fuel is mixed with the compressed air and combusted prior to being delivered to the turbine 130 where it is expanded. Work from the turbine 130 can be used to power the compressor 110 as well as any variety of other devices. Though the gas turbine engine 100 is depicted as a single spool turbojet engine, other embodiments of the gas turbine engine 100 can have multiple spools and can take any variety of other forms. To set forth just a few non-limiting examples, the gas turbine engine can take the form of a turbofan, turboprop, or turboshaft engine and can be a variable and/or adaptive cycle engine. In one application the gas turbine engine can be used as an aircraft powerplant.

As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, embodiments of the present application are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

Figure 2:
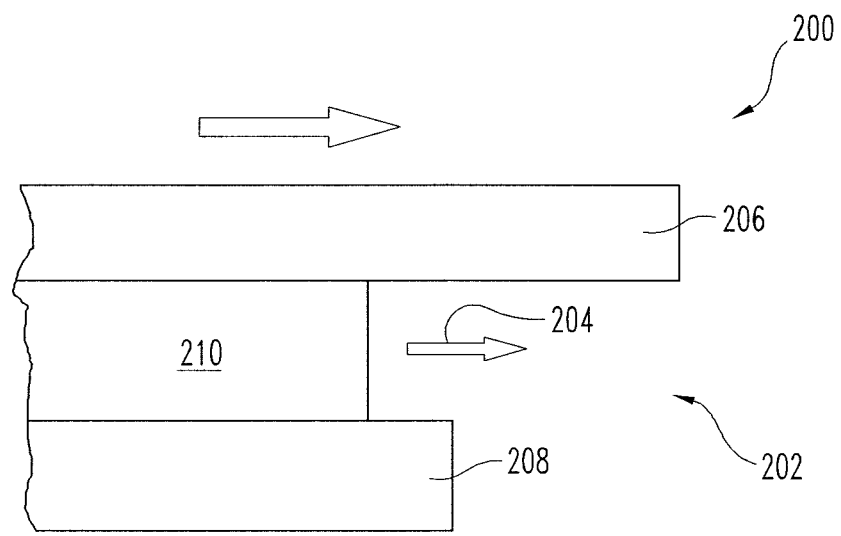
FIG. 2 is an embodiment of a gas turbine engine component.

Turning now to FIG. 2, one embodiment of a cooled component 200 used within and exposed to high temperatures of the gas turbine engine is shown in which a cooling slot 202 is used to expel a cooling fluid 204 to cool the component 200. The cooling slot 202 is located between opposing composite skins 206 and 208 which are used to enclose a foam core 210. The foam core 210 includes one or more passages that convey the cooling fluid 204 to the slot 202. Both of the foam core 210 and the skins 206 and 208 can be used to provide structural strength to the component 200. The cooling slot 202 can take any variety of forms and generally is longer in a width (in and out of the paper as viewed in the illustrated embodiment) than in a height (distance between the composite skins 206 and 208. Any number of slots can be used in the gas turbine engine component 200.

The cooled gas turbine engine component 200 having the cooling slot 202 can take any variety of forms. In one non-limiting embodiment the component 200 is an airfoil member such as a blade and or a vane of the gas turbine engine. The blades and/or vanes can be used in any location within the gas turbine engine 100, and in one form is used in the turbine 130. In another non-limiting embodiment the component 200 can take the form of a combustor liner which includes one or more slots 202.

The foam core 210 of the illustrated embodiments can take on any variety of foam types and in an embodiment is an open cell construction such that the cooling fluid is allowed to pass through a plurality of open cells. The foam core 210 can be a reticulated foam structure in which a skeletal foam structure (e.g. struts) exists without cell membranes which can be formed using any variety of processes. Regardless of manner of construction, the cells of the foam core 210 can have any variety of cell geometry, diameter, strut diameter, and strut lengths and can be tailored to provide a desired pressure drop. Several methods of producing the foam core can be used such as but not limited to slurry coating and direct foaming, among potential others. The foam can be made from a variety of materials. The foam core can provide rigidity and stiffness to the component, as well as provide a skeleton or base shape on which the composite skins can be coupled. In one form the foam core provides very little to no structural support to the cooled component 200.

The composite skins 206 and 208 generally include a plurality of fibers encased in a matrix material. The skins can have any variety of forms and can have one or more plies. In one embodiment the plies of composite skin 206 and 20 is made from a CMC material. The plies can be laid to create an airfoil shape in those embodiments where the component 200 is a blade or vane. In those embodiments having multiple plies, fiber ply orientation is not limited to uniform orientation between ply layers. Fiber orientations of ply or wrap layers can be perpendicular or transverse. Various layers can also contain different weaves such as but not limited to 2D or 3D weave or 2D braids. The layers can be formed as a wet prepreg lay up among other possible techniques.

During manufacture a matrix material can be introduced to the one or more plies using any variety of techniques including chemical vapor infiltration or slurry melt infiltration, among potential others. During infiltration the matrix can also be introduced into the foam core 210 resulting in a matrix and foam core combination that can be referred to as a composite in the sense that the combination of foam material and matrix can be two distinct phases and/or materials. Thus, where various embodiments of the cooled component are described and reference is made to a foam core it will be understood that the reference to the foam core can be to a foam without matrix or to a foam with infiltrated matrix material.

The composite skins 206 and 208 can have any variety of thicknesses that in some embodiments is determined by the number of plies in the skin. In those embodiments in which the component 200 is in the form of a blade or vane, the plies can be wrapped from the suction side of the airfoil to the pressure side (or vice versa) in construction such that skins 206 and 208 represents ends of the same skin wrapped around the leading edge of the airfoil. The component can also include separate skins if desired, such as, but not limited to, some embodiments of a combustor liner having the cooling slot 202.

Figure 3:
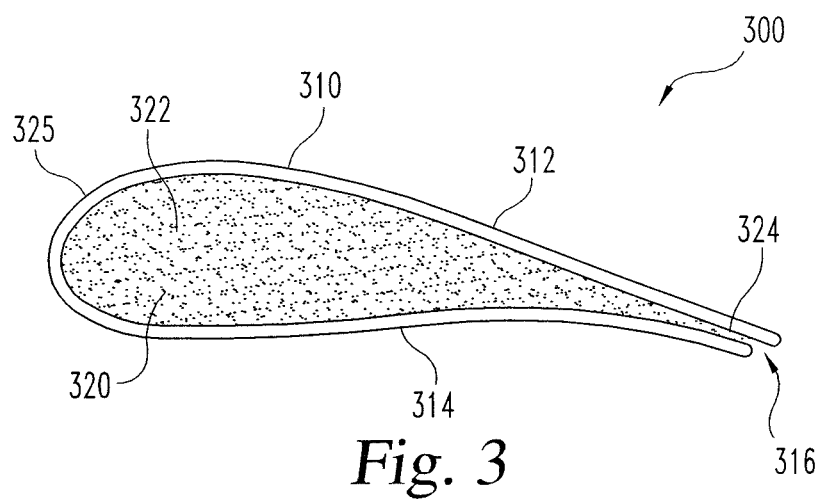
FIG. 3 is an illustration of an embodiment from the present application shaped as an airfoil.

Turning now to FIG. 3, another embodiment of the present application is shown having an airfoil shape 300. The component 300 includes a skin 310 providing structural capacity and a gas path shape with a first or top side 312 and a second or bottom side 314 where the terms top and bottom are used only for convenience with reference to the figure. Structural skin 310 can include a single ply or multiple wrap plies which may be made of CMC material and can take on any of the characteristics of skins 206 and/or 208.

The component 300 is also shown to include a foam core 320 to provide structural support to structural skin 310 and a passage for cooling fluid. Foam core 320 can take on any of the characteristics of foam core 210 with or without infiltrated matrix discussed above. In this illustration, foam core 320 is shown as extending substantially within the space 322 within the skin 310 from trailing edge portion 324 to the leading edge portion 325. In some forms the foam core 322 can extend the entirety of the space 322. Furthermore, the foam core 320 can include varying shapes filling various portions of central cavity 322, and in some forms is a construction of multiple foam cores 320, which can be collectively referred to in the singular as a core as will be appreciated.

Further in this embodiment, structural skin 310 encompasses nearly around the entirety of the foam core 320 but terminates such that foam core 320 is exposed to allow passage of cooling fluid. Cooling fluid passes through the open-cell structure of the foam core 320 and exits through a discontinuity 316 in structural skin 310 at trailing edge portion 324. Discontinuity 316 may include a single portion of structural skin 310 or multiple portions creating multiple discontinuities to allow passage of cooling fluid from foam core 320 through structural skin 310.

A trailing edge geometry of an exemplary airfoil component of an embodiment of the present application can have various shapes including an exposed foam portion at the trailing edge such as a contoured shape with a smooth continuous airfoil shape (can be machined after curing), a stepped shape with the foam core and bottom surface stopping short of the top surface, and the like.

Figure 4:
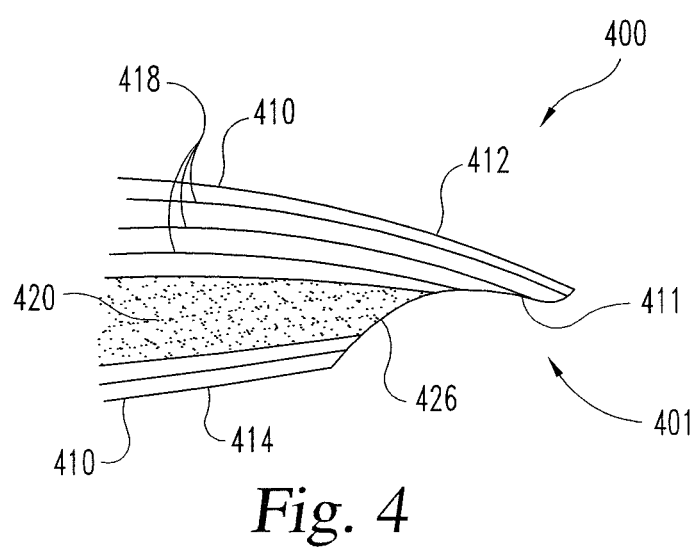
FIG. 4 is an illustration of a trailing edge portion of an airfoil component of another embodiment from the present application.

Turning now to FIG. 4, a trailing edge portion 401 of a vane or blade embodiment of component 400 is shown in which is formed a cooling passage in a gill slot configuration. The component 400 with trailing edge portion 401 is shown having a structural skin 410 with a first or top side 412 and a second or bottom side 414. Structural skin 410 can include CMC wrap plies 418. A foam core 420 (again, with or without matrix infiltration) is at least partially encompassed by structural skin 410 with an exposed portion 426 approximate trailing edge portion 401. The plies 418 and foam core 420 can take any form of skin and foam cores described herein. First side 412 of structural skin 410 is shown to extend beyond exposed portion 426 of the foam core 420 and second side 414 to form a step feature 411 at trailing edge portion 401. Step feature 411 can have a sharp transition between second side 414 and first side 412. Alternatively, step feature 411 may have a smooth transition between second side 414 and first side 412. Step feature 411 can further include multiple transition points. The multiple transition points can be determined by structural skin 410 features and/or foam core 420 features. The degree of transition can be different for first side 412 compared to second side 414. The step feature 411 can be characterized by a sharp turn away from the bottom side 414 toward the top side 412, and can be formed through careful selection of the skin 410 and foam core 420. In some forms the step feature 411 can be machined into the component 400.

Figure 5:
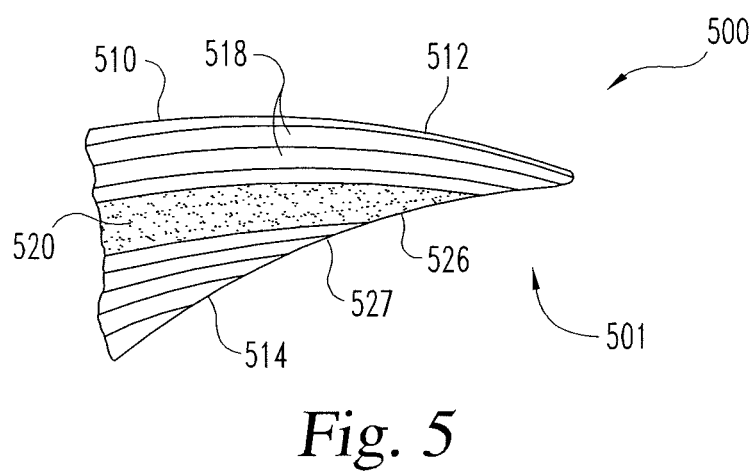
FIG. 5 is an illustration of a trailing edge portion of an airfoil component of yet another embodiment from the present application.

In yet another embodiment, FIG. 5 depicts a trailing edge portion 501 of a flow component 500 having trailing edge portion 501. The component 500 includes a structural skin 510 with a first or top side 512 and a second or bottom side 514. Structural skin 510 can include CMC wrap plies 518. A foam core 520 (again with or without matrix infiltration) is at least partially encompassed by structural skin 510 with an exposed portion 526 approximate trailing edge portion 501. The plies 518 and foam core 520 can take any form of skin and foam cores described herein. Exposed portion 526 of the foam core 520 and second side 514 are shown as formed to create a continuous shape 527 for trailing edge portion 501. This continuous forming can take place following the processing of the foam core and the wrap plies by machining the cured and bonded foam and skin portions together or separately. Continuous shape 527 can be present with single ply or multi-ply structural skin designs. For multi-ply designs, the continuous nature can result from gradual transitions from one ply to the next. Continuous shape 527 can also have variations in the degree of transition between one ply or section to the next.

In any of the embodiments of the present application described above, the foam core and structural skin can be co-cured for uni-body construction. In addition, in those embodiments having an airfoil shape, the airfoil shape can be any shape having an elongate cross section that can be used in various applications to redirect a flow and/or create a lifting force. Some non-limiting examples include subsonic NACA defined airfoils, faceted airfoils, shapes that are elongate in form that can be capable of providing lift when placed at an angle to a flow stream when constructed of appropriate materials, etc.

An embodiment of the present application is a structure with two distinct regions one being a reticulated foam core and the other being a respectively solid surface. The foam core extends from a central cavity to an exposed edge of a flow component and provides structural support for the gas turbine engine component. The solid surface defines a gas path shape and is used to encompass the foam core where a portion of the foam core is exposed to allow passage of a cooling fluid through the foam and out the exposed edge of the flow component.

In any of the embodiments described herein, a foam core having an infiltrated matrix can be used to share a proportion of load with the CMC skins, for example a load above the range of little to no support described above. In one form the foam core infiltrated with matrix can be used to support up to 50%-60% of a load imparted to the component during operation when the component is installed in a gas turbine engine. Such a load carrying capacity in this range can be enabled through infiltration of a matrix using chemical vapor infiltration techniques, among potential other infiltration techniques. In another embodiment the foam core can be infiltrated with matrix material to an extent that it is capable of supporting up to 90% of a load imparted to the component during operation. Such a load carrying capacity in this range can be enabled through infiltration using slurry melt infiltration, among potential other infiltration techniques.

In one embodiment, the foam core is made of an open-cell construction and the solid surface is made of CMC airfoil wrap plies. In a specific embodiment, a foam core extends from a central cavity to a trailing edge of an airfoil. The CMC airfoil wrap plies encompass the foam core but stop short to ensure the foam core is exposed to allow airflow through the trailing edge. In another embodiment, the solid surface includes a discontinuity that allows passage of cooling air from an encompassed foam core.

Numerous techniques can be used to manufacture the various embodiments of gas turbine engine components described herein. In one non-limiting embodiment, the foam core can be constructed after which composite plies are attached in a layup process. In another embodiment a matrix material used for the foam core and one or more composite layers can be infiltrated into both at the same time.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
   a cooled gas turbine engine airfoil member having an outer skin that forms a gas path surface of the cooled gas turbine engine airfoil member, the outer skin including a composite material having a matrix material;
   a foam core also having the matrix material and disposed internal to the composite material of the outer skin, the foam core occupying substantially an entirety of space internal to the composite material of the outer skin; and
   a foam based discharge slot having the matrix material also located at a trailing edge portion of the cooled gas turbine engine airfoil member wherein a width of the slot along a span of the airfoil member is greater than a height of the airfoil member in a thickness direction of the airfoil member, the foam core defining the foam based discharge slot and having a cooling passage through which cooling fluid exits the cooled gas turbine engine airfoil member.

2. The apparatus of claim 1, wherein the outer skin includes a plurality of composite layers.

3. The apparatus of claim 2, wherein the foam of the foam based discharge slot forms part of a pressure side of the cooled gas turbine engine airfoil member.

4. The apparatus of claim 2, wherein the foam based discharge slot is in the form of a gill slot having an aft portion that extends away from a pressure side of the airfoil member toward a suction side of the airfoil member.

5. The apparatus of claim 1, wherein the foam is a reticulated foam construction structured to convey a cooling fluid therethrough and deliver the fluid to the discharge slot.

6. The apparatus of claim 5, wherein the matrix material of the outer skin is a ceramic based composite material.

7. An apparatus comprising:
   a composite layer forming an outer portion of a gas turbine engine component having a cooling passage disposed therein, the gas turbine engine component having a first side of the composite layer and a second side of the composite layer, the first and second sides of the composite layer extending between an upstream portion of the gas turbine engine component and a downstream portion of the gas turbine engine component;
   a structural foam core disposed internal to the composite layer and substantially extending upstream of both the first side of composite layer and second side of the composite layer, the structural foam core having an open cell construction to permit a cooling fluid to pass; and
   a discharge slot having an elongate shape that includes a greater dimension in width than a dimension in a thickness direction, the discharge slot defined by the composite layer of the first side and second side to form a barrier edge to discourage bulk transfer of cooling fluid through the first side and second side, and wherein the discharge slot is also defined by the structural foam core that is disposed at an exit of the discharge slot and is sandwiched between the first side of composite layer and second side of composite layer.

8. The apparatus of claim 7, wherein the structural foam core is structured to bear greater than 50% of a load imparted to the gas turbine engine component.

9. The apparatus of claim 8, wherein the gas turbine engine component includes a plurality of discharge slots, wherein the gas turbine engine component is one of a blade and a vane, and which further includes a plurality of composite layers in the first side and the second side.

10. The apparatus of claim 9, wherein the exit forms a gas path surface of the component, and wherein the composite layer is a plurality of composite layers.

11. The apparatus of claim 9, wherein the discharge slot is a gill slot.

12. The apparatus of claim 8, which further includes a plurality of composite layers in the first side and second side, wherein the plurality of composite layers are formed from a ceramic matrix composite material, and wherein the gas turbine engine component is a combustor liner.

13. A method comprising:
providing a foam core of a gas turbine engine component; and
enveloping the foam core of the gas turbine engine component with a layer of fiber ply material;
infiltrating the layer of fiber ply material and the foam core with a matrix material to form a composite outer layer and a foam core having the matrix material; and
forming a cooling slot at a trailing edge of the gas turbine engine component such that a fluid passage internal to the foam core extends to an exit of the gas turbine engine composite at the cooling slot.

14. The method of claim 13, wherein the forming includes removing a portion of at least one of the layer of fiber ply material and the foam core, and wherein the gas turbine engine component is one of a blade and a vane.

15. The method of claim 13, wherein the providing includes receiving the foam core from an earlier manufacturing activity of forming the foam core, wherein the enveloping happens after the providing.

16. The method of claim 13, wherein the extending includes wrapping the layer of fiber ply material from a first side of the trailing edge of the gas turbine engine component, around a leading edge of the component, and to a second side of the trailing edge of the component.

17. The method of claim 16, wherein the enveloping and the extending occur as part of a composite ply lay-up operation, wherein the forming occurs no earlier than the laying, and which further includes laying a first portion of a second layer of fiber ply material upon the first portion of the layer of fiber ply material.

18. The method of claim 13, wherein the forming includes defining a cooling slot that extends along a span of the gas turbine engine component and that has a height smaller than a length of the extension along the span, and which further includes co-curing the foam core and the layer of fiber ply material during a rigidization process.

19. The apparatus of claim 7, wherein the gas turbine engine component forms one of a blade and a vane, the component having a plurality of composite plies arranged in an airfoil shape; and further comprising a core means for structurally supporting the gas turbine engine component, forming the internal cooling passage, and defining the discharge slot of the component.

20. The apparatus of claim 19, wherein the core means is a ceramic matrix composite material.

* * * * *